US009578287B2

(12) United States Patent
Tong et al.

(10) Patent No.: US 9,578,287 B2
(45) Date of Patent: Feb. 21, 2017

(54) METHOD, DEVICE AND SYSTEM FOR TELECONFERENCE INFORMATION INSERTION

(71) Applicant: ZTE Corporation, Shenzhen (CN)

(72) Inventors: Xin Tong, Shenzhen (CN); Fu Wang, Shenzhen (CN); Liangping Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/646,062

(22) PCT Filed: Aug. 30, 2013

(86) PCT No.: PCT/CN2013/082656
§ 371 (c)(1),
(2) Date: Sep. 8, 2015

(87) PCT Pub. No.: WO2014/079254
PCT Pub. Date: May 30, 2014

(65) Prior Publication Data

US 2016/0014376 A1 Jan. 14, 2016

(30) Foreign Application Priority Data

Nov. 20, 2012 (CN) .......................... 2012 1 0472301

(51) Int. Cl.
*H04N 7/15* (2006.01)
*H04M 3/56* (2006.01)
(Continued)

(52) U.S. Cl.
CPC ............. *H04N 7/152* (2013.01); *H04M 3/567* (2013.01); *H04N 5/9205* (2013.01); *H04N 7/01* (2013.01)

(58) Field of Classification Search
CPC ........ H04N 7/01; H04N 7/152; H04N 5/9205; H04M 3/567
(Continued)

(56) References Cited

U.S. PATENT DOCUMENTS 4,688,105 A * 8/1987 Bloch ................ G07F 17/0042 360/137
6,285,661 B1 * 9/2001 Zhu ........................ H04N 7/152 370/260
(Continued)

FOREIGN PATENT DOCUMENTS

CN 101159843 A 4/2008
CN 102769737 A 11/2012
JP 2009081803 A 4/2009

OTHER PUBLICATIONS

International Search Report for corresponding application PCT/CN2013/082656 filed Aug. 30, 2013; Mail date Dec. 12, 2013.
(Continued)

*Primary Examiner* — Gerald Gauthier
(74) *Attorney, Agent, or Firm* — Cantor Colburn LLP

(57) ABSTRACT

The disclosure provides a method, device and system for teleconference information insertion. The method includes: a valid insertion content is acquired according to a stored insertion content after an conference insertion request is detected, and a real-time content of a conference is switched to the valid insertion content. Thus, a purpose of information insertion in a conference is achieved by pre-storing an insertion content before or during the conference, then acquiring a valid insertion content according to the stored insertion content after a conference insertion request is detected during the conference and finally switching the real-time content of the conference to the insertion content, thereby enhancing the effect of the conference.

12 Claims, 4 Drawing Sheets

A valid insertion content is acquired according to a stored insertion content after a conference insertion request is detected — S101

A real-time content of a conference is switched to the insertion content — S102

(51) Int. Cl.
*H04N 5/92* (2006.01)
*H04N 7/01* (2006.01)

(58) Field of Classification Search
USPC .......... 348/14.09, 586, 14.07; 709/204, 224; 715/753, 202; 726/4; 370/260; 375/141; 379/202.01; 381/1; 382/232; 386/224; 700/94; 710/11
See application file for complete search history.

(56) References Cited

U.S. PATENT DOCUMENTS 6,850,266 B1 * 2/2005 Trinca .................... H04N 7/15 348/14.09
8,184,141 B2 * 5/2012 Caspi .................... H04N 5/272 348/14.01
8,813,196 B2 * 8/2014 Weller .............. G06F 17/30893 726/4
9,131,059 B2 * 9/2015 Jones .................... H04M 3/568
2002/0146133 A1 * 10/2002 Lee .................... H04S 1/007 381/1
2005/0004982 A1 * 1/2005 Vernon .................. G06Q 10/10 709/204
2006/0282184 A1 * 12/2006 Elias .................... H04M 11/066 700/94
2007/0047626 A1 * 3/2007 Elias .................... H04M 11/066 375/141
2007/0118552 A1 * 5/2007 Wang .................... G06F 17/24
2008/0030621 A1 * 2/2008 Ciudad .................. H04N 7/147 348/586
2008/0088693 A1 * 4/2008 Oh .......................... H04N 7/15 348/14.01
2008/0136899 A1 * 6/2008 Eisenberg .............. H04N 7/152 348/14.09
2009/0195638 A1 8/2009 Caspi et al.
2009/0199078 A1 * 8/2009 Caspi .................. H04L 12/1827 715/202
2009/0316872 A1 * 12/2009 Wolf .................... H04M 3/567 379/202.01
2011/0025818 A1 * 2/2011 Gallmeier ............... G06F 3/017 348/14.07
2011/0169910 A1 7/2011 Khot et al.
2011/0216153 A1 9/2011 Tasker
2011/0246678 A1 * 10/2011 Wu ........................ G06F 3/038 710/11
2012/0274728 A1 11/2012 Yasoshima
2013/0051689 A1 * 2/2013 Shimauchi ........... H04N 19/176 382/232
2013/0198288 A1 * 8/2013 Jones .................. H04L 12/1831 709/204
2014/0317288 A1 * 10/2014 Krueger .............. H04L 41/5025 709/224
2015/0200982 A1 * 7/2015 Velagaleti ............. H04L 65/403 715/753
2016/0014376 A1 * 1/2016 Tong .................... H04M 3/567 348/14.09

OTHER PUBLICATIONS

Supplementary European Search Report for corresponding application EP 13857359; Mail date Dec. 10, 2015.

* cited by examiner

METHOD, DEVICE AND SYSTEM FOR TELECONFERENCE INFORMATION INSERTION

TECHNICAL FIELD

The disclosure relates to the communications field, and in particular to a method, device and system for teleconference information insertion.

BACKGROUND

With continuous and rapid construction of information communication networks in China, the communication level of China has been greatly improved to provide reliable guarantee for information exchange of every walk of life. Among numerous communication services, teleconference, especially a video conference service has shown more and more a good growth momentum. A video conference is a multimedia communication method for conferencing through a communication network by using video technology and devices. A video conference system joins conference terminals of multiple locales in a conference through a Multipoint Control Unit (MCU) so as to implement communication among a plurality of conference terminals. During the video conference, representatives at two or more different locations may hear voices from each other and see images of each other, and may also simultaneously see a scene of a conference room of each other as well as an object, a picture, a table, a file and so on presented in the conference, thus “shortening” a distance between representatives and enhancing the effect of the conference so that everybody are just like participating in the conference in the same place, and working efficiency is improved significantly.

However, information insertion may be required during the conference in practical application of a teleconference system. For example, a certain conferee wants to insert a piece of audio or video information into the conference so that the audio or video information may be presented to other conferees, or the certain conferee who cannot attend the conference pre-records a speech video or audio and it is expected that a speech content is inserted and presented to other conferees during the conference. However, a current video system still cannot satisfy such a requirement, thus the effect of the conference is influenced.

SUMMARY

A main purpose of the embodiments of the disclosure is to provide a method, device and system for teleconference information insertion, so as to at least solve a problem in the related art that information cannot be inserted during a teleconference.

The method for teleconference information insertion of disclosure, includes the following steps:

acquiring a valid insertion content according to a stored insertion content after a conference insertion request is detected, switching a real-time content of a conference to the valid insertion content.

In an example embodiment, acquiring the valid insertion content according to the stored insertion content includes:

judging whether a format of the stored insertion content is consistent with a format of a conference content;

when the format of the stored insertion content is consistent with the format of the conference content, acquiring the stored insertion content directly;

when the format of the stored insertion content is not consistent with the format of the conference content, converting the format of the stored insertion content is converted into a format consistent with the format of the conference content and then acquiring a converted insertion content.

In an example embodiment, the stored insertion content includes:

an existing insertion content, or a newly recording and then stored insertion content.

The device for a teleconference information insertion of the disclosure includes an insertion component and an MCU, wherein the insertion component is configured to store an insertion content, detect a conference insertion request, and acquire a valid insertion content according to the stored insertion content after detecting the conference insertion request of the conference, and send the conference insertion request and the valid insertion content to the MCU;

the MCU is configured to receive the conference insertion request and the valid insertion content, and switch a real-time content of a conference to the valid insertion content.

In an example embodiment, the insertion component is configured to:

judge whether a format of the stored insertion content is consistent with a format of a conference content;

when the format of the stored insertion content is consistent with the format of the conference content, acquire the stored insertion content directly;

when the format of the stored insertion content is not consistent with the format of the conference content, convert the format of the stored insertion content into a format consistent with the format of the conference content and then acquire the converted insertion content.

In an example embodiment, the insertion component is configured to store an existing insertion content or a newly recording and then stored insertion content.

The system for a teleconference information insertion of the disclosure includes a conference terminal and an MCU, wherein:

the conference terminal is configured to store an insertion content, detect a conference insertion request, and acquire a valid insertion content according to the stored insertion content after detecting the conference insertion request of the conference, and send the conference insertion request and the valid insertion content to the MCU;

the MCU is configured to receive the conference insertion request and the valid insertion content, and switch a real-time content of a conference to the valid insertion content.

In an example embodiment, the conference terminal is configured to:

judge whether a format of the stored insertion content is consistent with a format of a conference content;

when the format of the stored insertion content is consistent with the format of the conference content, acquire the stored insertion content directly;

when the format of the stored insertion content is not consistent with the format of the conference content, convert the format of the stored insertion content into a format consistent with the format of the conference content and then acquire the converted insertion content.

In an example embodiment, the conference terminal is configured to store an existing insertion content or a newly recording and then stored insertion content.

A method for information insertion is provided according to the disclosure, which implements the information insertion during a conference by pre-storing an insertion content before or during the conference, then acquiring a valid insertion content according to a stored insertion content after an conference insertion request is detected during the conference and finally switching a real-time content of the conference to the insertion content, thereby enhancing the effect of the conference.

The achievement of the object, the functional features and the advantages of the disclosure and are described below with reference to accompanying drawings when read in conjunction with embodiments.

DETAILED DESCRIPTION OF THE EMBODIMENTS

It should be appreciated that the embodiments described herein are merely illustrative of the disclosure but not to be construed as limiting the disclosure.

Figure 1:
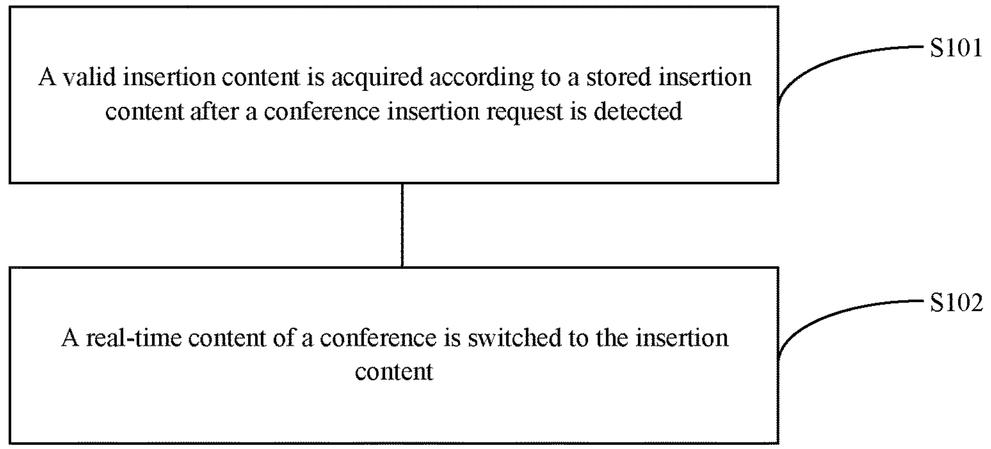
FIG. 1 is a flowchart of a method for information insertion according to a first embodiment of the disclosure.
Figure 2:
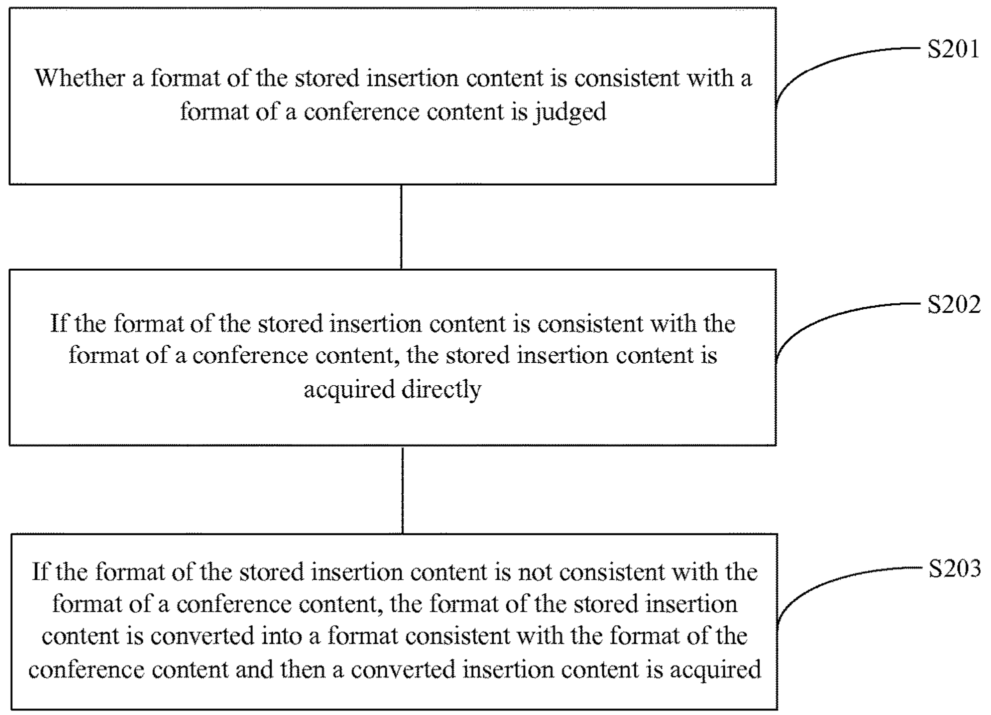
FIG. 2 is another flowchart of the method for information insertion according to the first embodiment of the disclosure.

Referring to FIG. 1 and FIG. 2, a method for information insertion according to a first embodiment of the disclosure is provided, which includes the following steps.

Step 101: a valid insertion content is acquired according to a stored insertion content after a conference insertion request is detected.

In the Step 101, the conference insertion request is detected in real time. After the conference insertion request is detected, the valid insertion content that can be played in the conference is acquired according to the stored insertion content, wherein the stored insertion content may be an existing insertion content including a video, an audio and so on before or during the conference. For example, an insertion content stored on a storage device is transferred to a local memory, or an existing insertion content is acquired from the Internet and then transferred to the local memory. A new insertion content including an audio, a video and so on may be also recorded according to an appointed format, and then stored in the local memory. The insertion content may be a speech video or audio pre-recorded by a certain conferee, who cannot attend the conference, or may be also an advertising clip and so on.

The step 101 specifically includes the following steps.

Step 201: Whether a format of the stored insertion content is consistent with a format of a conference content is judged.

The format of the insertion content needs to be consistent with the format of the conference content in order to ensure that the insertion content can be played successfully, thus it is necessary to judge whether the format of the stored insertion content is consistent with the format of the conference content.

Step 202: If the format of the stored insertion content is consistent with the format of the conference content, the stored insertion content is acquired directly.

Generally, a format of a newly-recording and then stored insertion content according to an appointed format is consistent with the format of the conference content, or a format of an existing stored insertion content happens to be consistent with the format of the conference content, then the insertion content may be acquired directly.

Step 203: If the format of the stored insertion content is not consistent with the format of the conference content, the format of the stored insertion content is converted into a format consistent with the format of the conference content and then a converted insertion content is acquired.

In the Step 203, if it is determined that the format of the pre-stored insertion content is inconsistent with the format of the conference content, the format of the insertion content is converted so that the format of the converted insertion content is consistent with the format of the conference content, and the converted insertion content is acquired subsequently.

Besides an inconsistent format, the pre-stored insertion content may be also damaged, and may be acquired after being repaired. If a part of the pre-stored insertion content cannot be repaired, an undamaged part of pre-stored insertion content may be also acquired.

After the valid insertion content is acquired, entering into the next step.

Step 102: a real-time content of a conference is switched to the insertion content.

In the Step 102, the real-time content of the conference is switched to the insertion content after the valid insertion content is acquired, thereby implementing information insertion during the conference.

Hereby, the embodiment of the disclosure implements information insertion during the conference by pre-storing the insertion content before or during the conference, then acquiring the valid insertion content according to the stored insertion content after the conference insertion request is detected during the conference and finally switching the real-time content of the conference to the insertion content, thereby enhancing the effect of the conference.

In a practical application of a teleconference, information insertion may be initiated by an MCU side, and may be also initialized by a conference terminal side, which will be respectively expounded herein by examples.

Figure 3:
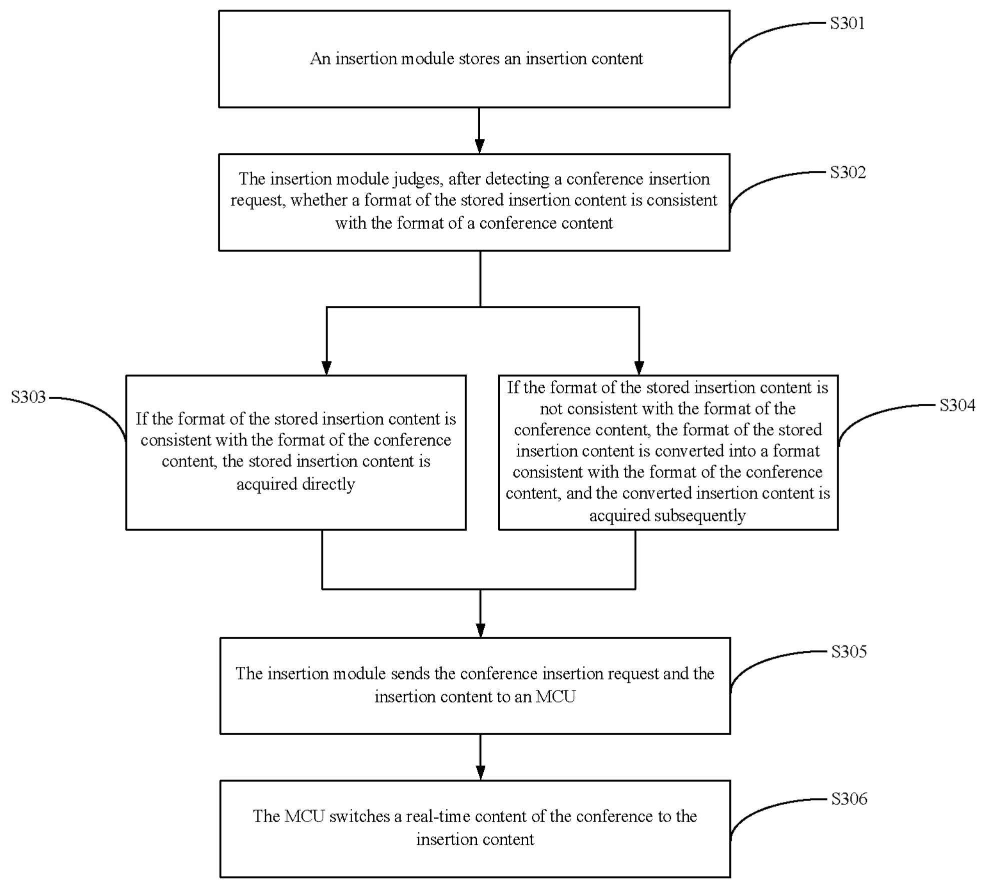
FIG. 3 is a flowchart of a method for information insertion according to a second embodiment of the disclosure.

Referring to FIG. 3, a method for information insertion according to a second embodiment of the disclosure is provided. Information insertion is initiated by the MCU side in the second embodiment of the disclosure. Provided that there are two conference terminals in the conference: a conference terminal A and a conference terminal B, the MCU side will initiate insertion during the conference, and a specific process is as follows.

Step 301: an insertion component stores the insertion content.

In the Step 301, the insertion component of the MCU side may store an existing insertion content including a video, audio, and so on before or during the conference. For example, an insertion content stored on a storage device is transferred to the insertion component, or an existing insertion content is acquired from the Internet and then transferred to the insertion component. A new insertion content including an audio, a video and so on may be also recorded according to an appointed format, and stored in the insertion component. The insertion content may be a speech video or audio pre-recorded by a certain conferee, who cannot attend the conference, or may be also an advertising clip and so on.

Step 302: the insertion component judges, after detecting a conference insertion request, whether a format of the stored insertion content is consistent with a format of a conference content.

In the Step 302, the insertion component of the MCU side detects the conference insertion request in real time, and judges, after detecting the conference insertion request, whether the format of the pre-stored insertion content is consistent with the format of the conference content.

Step 303: If the format of the pre-stored insertion content is consistent with the format of the conference content, the stored insertion content is acquired directly.

Generally, a format of a new insertion content recorded by the insertion component according to an appointed format is consistent with the format of a conference content, or if an existing insertion content stored by the insertion component happens to be consistent with the format of the conference content, then the insertion content may be played availably in the conference and thus the insertion content may be acquired directly.

Step 304: if the format of the pre-stored insertion content is not consistent with the format of the conference content, the format of the stored insertion content is converted into a format consistent with the format of the conference content, and the converted insertion content is acquired subsequently.

In the Step 304, if determining that the format of the pre-stored insertion content is inconsistent with the format of the conference content, the insertion component converts the format of the insertion content so that the format of the insertion content is consistent with the format of the conference content and the insertion content becomes the insertion content that can be played availably in the conference, and then the converted insertion content is acquired.

Of course, the pre-stored insertion content may be also damaged besides an inconsistent format. The insertion component may acquire the insertion content after repairing it. If a part of the content cannot be repaired, an undamaged part of the content may be also acquired.

Step 305: the insertion component sends the conference insertion request and the insertion content to the MCU.

In the Step 305, the insertion component sends the conference insertion request and the insertion content to the MCU after acquiring the insertion content that can be played availably.

Step 306: the MCU switches the real-time content of the conference to the insertion content.

In the Step 306, the MCU synthesizes and sends the insertion content to the conference terminal A and the conference terminal B respectively after receiving the conference insertion request and the insertion content so as to switch the real-time content of the conference to the insertion content. Each conference terminal and conferee may see the insertion content including a video, an audio and so on simultaneously, thus implementing information insertion during the conference. Besides, the insertion component of the MCU side may be also integrated to the MCU, then the insertion component does not need to send the insertion content to the MCU, and may acquire the valid insertion content directly and send the insertion content to each conference terminal.

Figure 4:
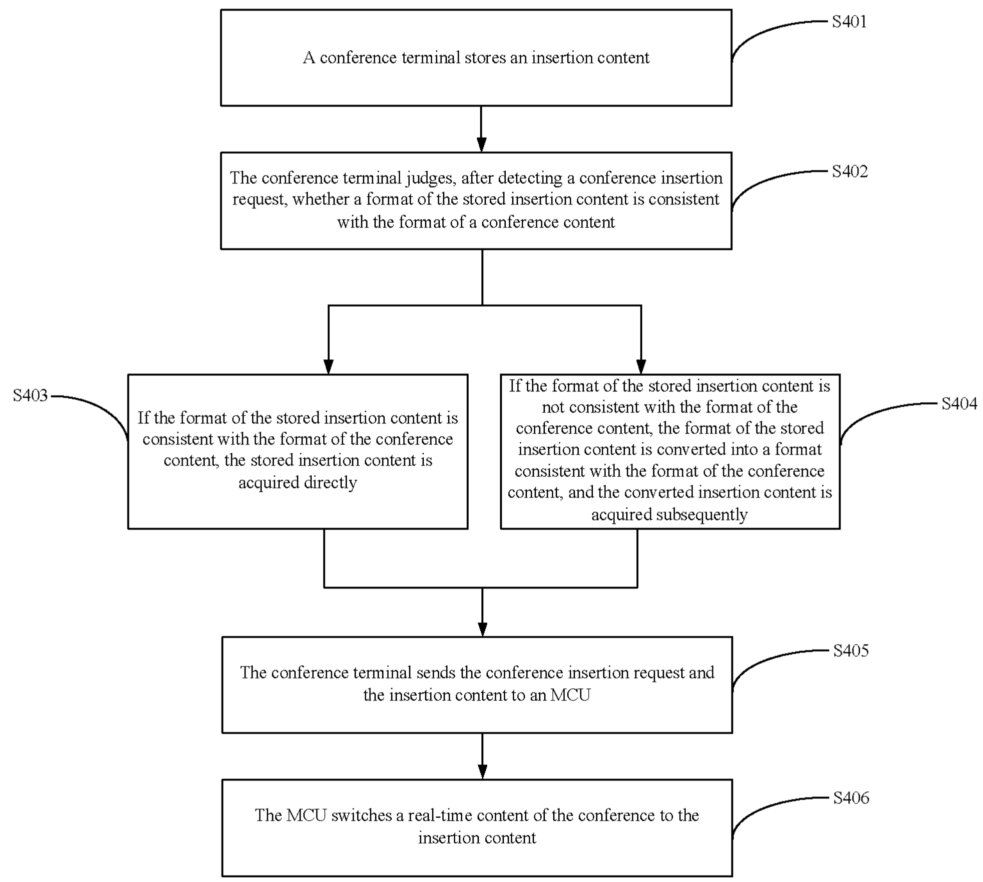
FIG. 4 is a flowchart of a method for information insertion according to a third embodiment of the disclosure.

Referring to FIG. 4, a method for information insertion according to a third embodiment of the disclosure is provided. Information insertion is initiated by a conference terminal side in the present embodiment. Provided that there are 3 conference terminals in a conference: a conference terminal A, a conference terminal B and a conference terminal C, among which the conference terminal C initiates insertion during the conference and a specific process is as follows.

Step 401: a conference terminal stores an insertion content.

In the Step 401, the conference terminal C may store an existing insertion content including a video, an audio and so on before or during the conference. For example, an insertion content stored on a storage device is transferred to the conference terminal C, or an existing insertion content is acquired from the Internet and then transferred to the conference terminal C. A new insertion content including an audio, a video and so on may be also recorded according to an appointed format, and stored in the conference terminal C. The insertion content may be a speech video or audio pre-recorded by a certain conferee, who cannot attend the conference, or may be also an advertising clip and so on.

Step 402: after detecting an conference insertion request, the conference terminal judges whether a format of the stored insertion content is consistent with the format of a conference content.

In the Step 402, the conference terminal C detects the conference insertion request in real time, and judges, after detecting the conference insertion request, whether the format of the pre-stored insertion content is consistent with the format of the conference content.

Step 403: If the format of the pre-stored insertion content is consistent with the format of the conference content, the stored insertion content is acquired directly.

Generally, a format of a new insertion content recorded by the conference terminal C according to an appointed format is consistent with the format of the conference content, or a format of an existing stored insertion content happens to be consistent with the format of the conference content, then the insertion content may be play availably during the conference, thus the insertion content may be acquired directly.

Step 404: If the format of the pre-stored insertion content is not consistent with the format of the conference content, the format of the stored insertion content is converted into a format consistent with the format of the conference content and then the converted insertion content is acquired.

In the Step 404, if determining that the format of the pre-stored insertion content is inconsistent with the format of the conference content, the conference terminal C converts the format of the insertion content so that the format of the converted insertion content is consistent with the format of the conference content and the insertion content becomes an insertion content that may be played availably during the conference, and then the converted insertion content is acquired.

Of course, the pre-stored insertion content may be also damaged besides an inconsistent format. The conference terminal may acquire the insertion content after repairing it. If a part of the content cannot be repaired, an undamaged part of the content may be also acquired.

Step 405: the conference terminal sends the conference insertion request and the insertion content to the MCU.

In the Step 405, the conference terminal C sends the conference insertion request and the insertion content to the MCU after acquiring the insertion content that can be played availably.

Step 406: The MCU switches a real-time content of the conference to the insertion content.

In the Step 406, the MCU synthesizes and sends the insertion content to the conference terminal A, the conference terminal B and the conference terminal C respectively after receiving the conference insertion request and the insertion content so as to switch the real-time content of the conference to the insertion content. Each conference terminal and conferee may see the insertion content including a video, an audio and so on simultaneously, thus implementing information insertion during the conference.

Figure 5:
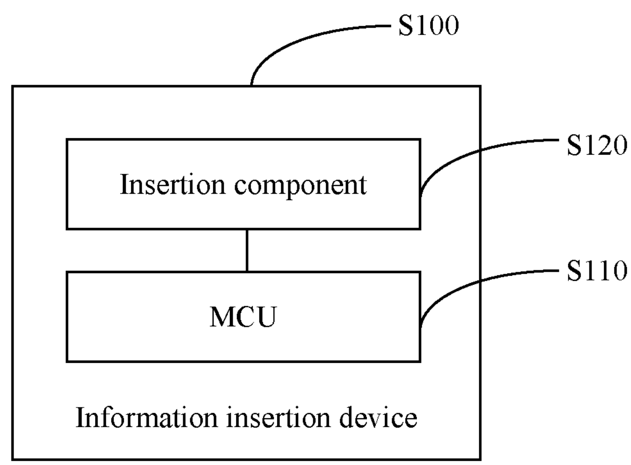
FIG. 5 is a structural diagram of a device for information insertion according to a preferred embodiment of the disclosure.
Figure 6:
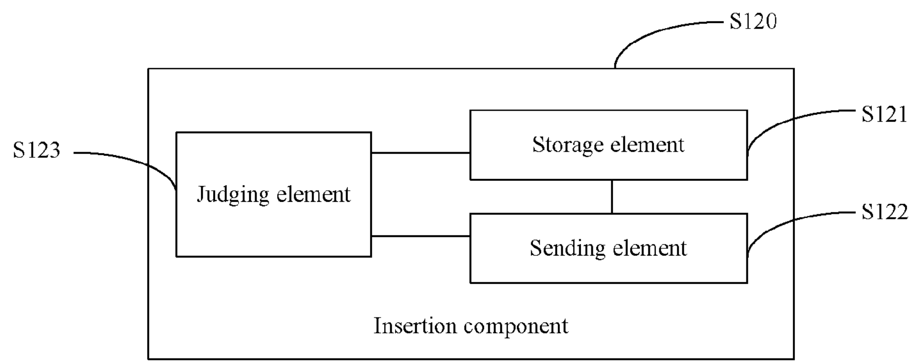
FIG. 6 is a structural diagram based on a storage component in FIG. 5 of the disclosure.

Referring to FIG. 5 and FIG. 6, a device for information insertion according to a preferred embodiment of the disclosure is provided. An information insertion device 100 includes an insertion component 120 and an MCU 110, wherein the insertion component 120 is configured to store an insertion content, detect a conference insertion request, and acquire a valid insertion content according to the stored insertion content after detecting the insertion request of the conference, and send the conference insertion request and the valid insertion content to the MCU; while the MCU 110 is configured to receive the conference insertion request and the valid insertion content sent by the insertion component 120, and switch a real-time content of the conference to the valid insertion content.

The insertion component 120 includes a storage element 121, a sending element 122 and a judging element 123. The storage element 121 may store an existing insertion content including a video, an audio and so on before or during the conference. For example, an insertion content stored on another storage device is transferred to the storage element 121, or an existing insertion content is acquired from the Internet and then transferred to the storage element 121. The storage element 121 may also record a new insertion content including an audio, a video and so on according to an appointed format, and then store the insertion content. The insertion content may be a speech video or audio pre-recorded by a certain conferee, who cannot attend the conference, or may be also an advertising clip and so on.

The judging element 123 detects the insertion request of the conference in real time, and judges, after detecting the insertion request of the conference, whether the insertion content pre-stored in the storage element 121 can be played availably during the conference, and if the insertion content pre-stored in the storage element 121 can be played availably during the conference, sends to the sending element 122 an availability signal and the insertion request, while the sending element 122 acquires the pre-stored insertion content directly from the storage element 121 and sends the insertion content and the conference insertion request to the MCU 110. If the insertion content cannot be played availably, the judging element 123 sends to the sending element 122 a corresponding unavailability signal and the conference insertion request while the sending element 122 converts or repairs the pre-stored insertion content, and then acquires the converted or repaired insertion content, and sends the insertion content and the conference insertion request to the MCU 110 subsequently.

For example, the judging element 123 judges whether a format of the pre-stored insertion content is consistent with the format of a conference content, and if the format of the pre-stored insertion content is consistent with the format of the conference content, the judging element 123 sends the availability signal and the conference insertion request to the sending element 122, while the sending element 122 acquires the pre-stored insertion content directly from the storage element 121 and sends the insertion content and the conference insertion request to the MCU 110. If the format of the pre-stored insertion content is not consistent with the format of the conference content, the judging element 123 sends the corresponding unavailability signal and the conference insertion request to the sending element 122 while the sending element 122 converts the format of the pre-stored insertion content into a format consistent with the format of the conference content and then acquires the converted insertion content, and sends the insertion content and the conference insertion request to the MCU 110 subsequently.

As another example, the judging element 123 detects that the pre-stored insertion content is damaged, and then sends to the sending element 122 a signal indicating that the insertion content is damaged and unavailable, and the element insertion request, while the sending element 122 repairs the insertion content, and then acquires a repaired insertion content, and sends the insertion content and the conference insertion request to the MCU 110 subsequently. If a part of the pre-stored insertion content cannot be repaired, the sending element 122 acquires an undamaged part of the pre-stored insertion content, and then sends the undamaged part of the pre-stored insertion content and the conference insertion request to the MCU 110.

After receiving the insertion content and the conference insertion request sent by the insertion component 120, the MCU 110 synthesizes and sends the insertion content to each conference terminal so as to switch the real-time content of the conference to the insertion content.

Besides, the insertion component 120 may be also integrated to the MCU 110, then the insertion component 120 saves the sending element 122 and does not need to send the insertion content to the MCU 110, and the MCU 110 may acquire the valid insertion content directly and sends the valid insertion content to each conference terminal.

Hereby, the information insertion device 100 of the present embodiment implements information insertion during a conference by pre-storing an insertion content through the insertion component 120, then acquiring the valid insertion content according to the stored insertion content after the conference insertion request is detected, then sending the insertion content and the conference insertion request to the MCU 110, and switching a real-time content of the conference to the insertion content by the MCU 110, thereby enhancing the effect of the conference.

Figure 7:
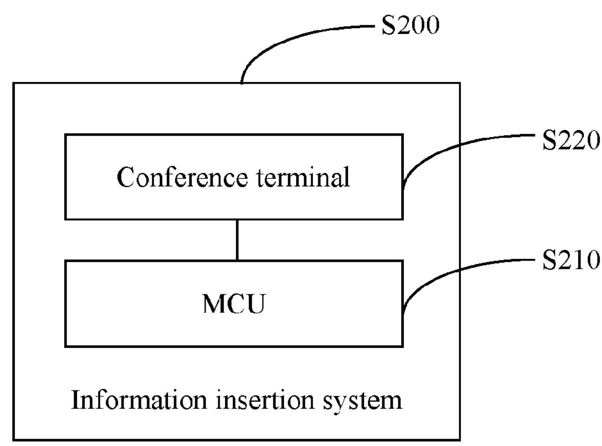
FIG. 7 is a structural diagram of a system for information insertion according to a preferred embodiment of the disclosure.
Figure 8:
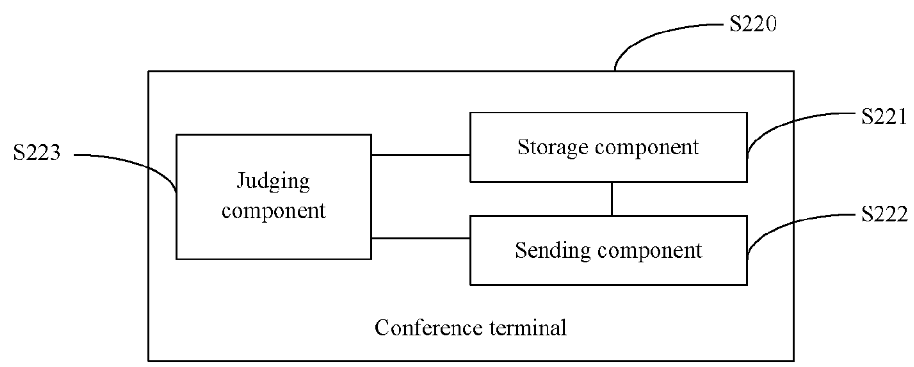
FIG. 8 is a structural diagram based on a conference terminal in FIG. 7 of the disclosure.

Referring to FIG. 7 and FIG. 8, a system for information insertion according to a preferred embodiment of the disclosure is provided. The information insertion system 200 includes a conference terminal 220 and an MCU 210, wherein the conference terminal 220 is configured to store an insertion content, detect a conference insertion request, and acquire a valid insertion content according to the stored insertion content after detecting the conference insertion request, and send the conference insertion request and the valid insertion content to the MCU 210; while the MCU 210 is configured to receive the conference insertion request and the valid insertion content sent by the conference terminal 220, and switch a real-time content of the conference to the valid insertion content.

The conference terminal 220 includes a storage component 221, a sending component 222 and a judging component 223. The storage component 221 may store an existing insertion content including a video, an audio and so on before or during the conference. For example, an insertion content stored on another storage device is transferred to the storage component 221, or an existing insertion content is acquired from the Internet and then transferred to the storage component 221. The storage component 221 may also record a new insertion content including an audio, a video and so on according to an appointed format, and then store the insertion content. The insertion content may be a speech video or audio pre-recorded by a certain conferee, who cannot attend the conference, or may be also an advertising clip and so on.

The judging component 223 detects the conference insertion request in real time, and judges, after detecting the conference insertion request, whether the insertion content pre-stored in the storage component 221 can be played availably during the conference, and if the insertion content pre-stored in the storage component 221 can be played availably during the conference, sends to the sending component 222 an availability signal and the conference insertion request, while the sending component 222 acquires the pre-stored insertion content directly from the storage component 221 and sends the pre-stored insertion content and the conference insertion request to the MCU 210. If the insertion content cannot be played availably, the judging component 223 sends a corresponding unavailability signal and the conference insertion request to the sending component 222 while the sending component 222 converts or repairs the pre-stored insertion content, and then acquires a converted or repaired insertion content, and sends the converted or repaired insertion content and the conference insertion request to the MCU 210 subsequently.

For example, the judging component 223 judges whether a format of the pre-stored insertion content is consistent with a format of a conference content, and if the format of the pre-stored insertion content is consistent with the format of the conference content, the judging component 223 sends the availability signal and the conference insertion request to the sending component 222, while the sending component 222 acquires the pre-stored insertion content directly from the storage component 221 and sends the pre-stored insertion content and the conference insertion request to the MCU 210. If the format of the pre-stored insertion content is not consistent with the format of the conference content, the judging component 223 sends the corresponding unavailability signal and the conference insertion request to the sending component 222, while the sending component 222 converts the format of the pre-stored insertion content into a format consistent with the format of the conference content and then acquires a converted insertion content, and sends the converted insertion content and the conference insertion request to the MCU 210 subsequently.

As another example, the judging component 223 detects that the pre-stored insertion content is damaged, and then sends to the sending component 222 a signal indicating that the insertion content is damaged and unavailable, and the conference insertion request, while the sending component 222 repairs the insertion content, and then acquires a repaired insertion content, and sends repaired the insertion content and the conference insertion request to the MCU 210 subsequently. If a part of the pre-stored insertion content cannot be repaired, the sending component 222 acquires an undamaged part of the pre-stored insertion content, and then sends the undamaged part of the pre-stored insertion content of the part and the conference insertion request to the MCU 210.

After receiving the insertion content and the insertion request sent by the conference terminal 220, the MCU 210 synthesizes and sends the insertion content to each conference terminal so as to switch the real-time content of the conference to the insertion content.

Hereby, the information insertion system 220 of the present embodiment implements information insertion during the conference by pre-storing the insertion content through the conference terminal 220, then acquiring the valid insertion content according to the stored insertion content after the conference insertion request is detected, then sending the insertion content and the conference insertion request to the MCU 210, and switching a real-time content of the conference to the insertion content by the MCU 210, thereby enhancing the effect of the conference.

INDUSTRIAL APPLICABILITY

As mentioned above, a method, device and system teleconference information insertion is provided according to the embodiments of the disclosure having the following beneficial effect that information insertion during a conference is implemented by pre-storing an insertion content before or during the conference, then acquiring a valid insertion content according to a stored insertion content after an conference insertion request is detected during the conference and finally switching a real-time content of the conference to the insertion content, thereby enhancing the effect of the conference.

It should be understood that above description is only to illustrate the example embodiments but not to limit the scope of the disclosure; and the direct or indirect application of any equivalent structure or equivalent flow devised as defined by the description and accompanying drawings of the disclosure to other related fields should also fall within the protection scope of the disclosure.

What is claimed is:

1. A method for teleconference information insertion, comprising:

acquiring, via a Multipoint Control Unit of a conference system, a valid insertion content according to a stored insertion content after a conference insertion request is detected, wherein the conference system comprises a plurality of conference terminals and an insertion component; and switching, via the Multipoint Control Unit, a real-time content of a conference to the valid insertion content.

2. The method according to claim 1, wherein the acquiring comprises:

determining, via the insertion component of the Multipoint Control Unit, whether a format of the stored insertion content is consistent with a format of a conference content;

acquiring, via the insertion component of the Multipoint Control Unit, the stored insertion content directly when the format of the stored insertion content is consistent with the format of the conference content; and converting, via the insertion component of the Multipoint Control Unit, the format of the stored insertion content into a format consistent with the format of the conference content and then acquiring a converted insertion content, when the format of the stored insertion content is not consistent with the format of the conference content.

3. The method according to claim 1, wherein the stored insertion content comprises:

an existing insertion content; and a newly recorded and then stored insertion content.

4. The method according to claim 2, wherein the stored insertion content comprises:

an existing insertion content; and a newly recorded and then stored insertion content.

5. A device for teleconference information insertion, comprising:

a Multipoint Control Unit (MCU) configured to receive a content insertion request and a valid insertion content from one or more conference terminals, and switch a real-time content of a conference to the valid insertion content, and wherein the Multipoint Control Unit comprises:

an insertion component configured to store an insertion content, detect the conference insertion request, acquire the valid insertion content according to the stored insertion content after detecting the conference insertion request, and send the conference insertion request and the valid insertion content to the MCU.

6. The device according to claim 5, wherein the insertion component is configured to:

determine whether a format of the stored insertion content is consistent with a format of a conference content;

acquire the stored insertion content directly, when the format of the stored insertion content is consistent with the format of the conference content; and convert the format of the stored insertion content into a format consistent with the format of the conference content and then acquire the converted insertion content, when the format of the stored insertion content is not consistent with the format of the conference content.

7. The device according to claim 5, wherein the insertion component is configured to store an existing insertion content and a newly recording and then stored insertion content.

8. The device according to claim 6, wherein the insertion component is configured to store an existing insertion content and a newly recording and then stored insertion content.

9. A system for teleconference information insertion, comprising:

a Multipoint Control Unit (MCU) configured to receive a conference insertion request and a valid insertion content, and switch a real-time content of a conference to the valid insertion content; and a conference terminal configured to store an insertion content, detect a conference insertion request, acquire the valid insertion content according to the stored insertion content after detecting the conference insertion request, and send the conference insertion request and the valid insertion content to the MCU.

10. The system according to claim 9, wherein the conference terminal is configured to:

determine whether a format of the stored insertion content is consistent with a format of a conference content;

acquire the stored insertion content directly, when the format of the stored insertion content is consistent with the format of the conference content; and convert the format of the stored insertion content into a format consistent with the format of the conference content and then acquire the converted insertion content, when the format of the stored insertion content is not consistent with the format of the conference content.

11. The system according to claim 9, wherein the conference terminal is configured to store an existing insertion content and a newly recording and then stored insertion content.

12. The system according to claim 10, wherein the conference terminal is configured to store an existing insertion content and a newly recording and then stored insertion content.

* * * * *